United States Patent [19]
Page, Jr.

[11] 3,730,580
[45] May 1, 1973

[54] VAN CONVERSION TO CAMPER VEHICLE

[76] Inventor: John S. Page, Jr., 2842 5th Street, Boulder, Colo. 80302

[22] Filed: Aug. 13, 1971

[21] Appl. No.: 171,637

[52] U.S. Cl. ................................ 296/23 R, 296/26
[51] Int. Cl. ........................................... B60p 3/34
[58] Field of Search ................... 296/23 MC, 23 R, 296/26; 52/66

[56] References Cited

UNITED STATES PATENTS

| | | | |
|---|---|---|---|
| 3,420,566 | 1/1969 | Obra | 296/23 MC |
| 2,645,518 | 7/1953 | Cook | 296/23 MC |
| 3,347,589 | 10/1967 | Sirk | 296/23 R |

*Primary Examiner*—Philip Goodman
*Attorney*—White, Haefliger & Bachand

[57] ABSTRACT

Apparatus to rearwardly extend the interior of a van body having a support frame, a rear door frame and rear doors hinged to the body to open rearwardly away from the door frame, includes:
  a. a forwardly opening enclosure including a deck, side walls, rear wall and roof, the enclosure sized to extend directly at the rear of the van body when said doors are opened rearwardly from the door frame, and
  b. a lower support for the enclosure located for attachment to rearward extent of the van body support frame.

A stove and/or sink may be carried in the enclosure to be accessible from the van body interior, and the enclosure roof may be mounted for optional movement between raised and lowered positions.

11 Claims, 8 Drawing Figures

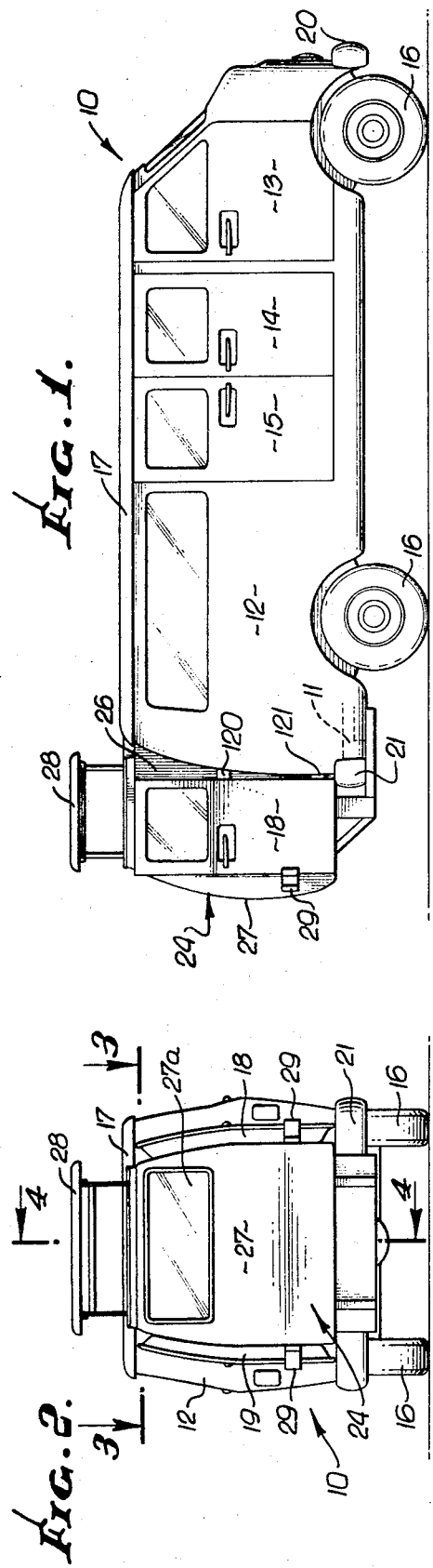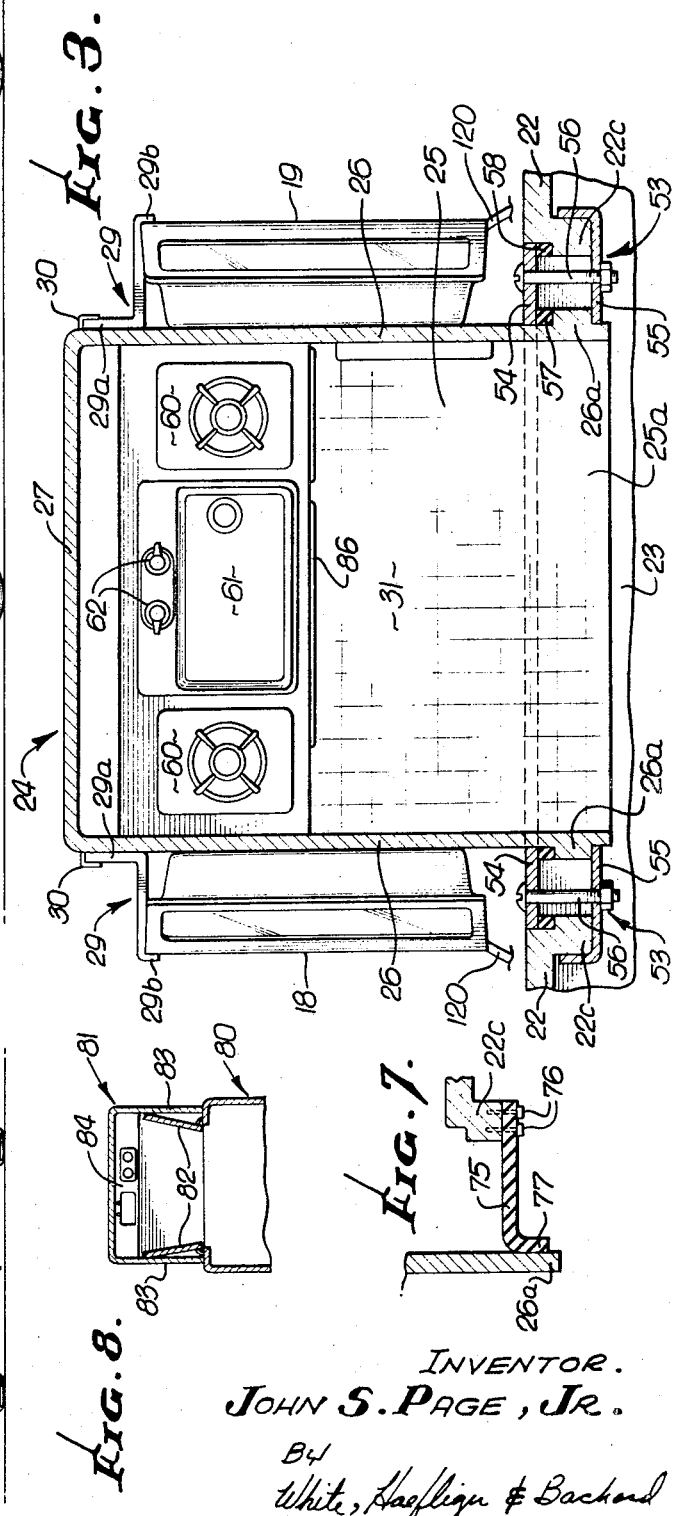
PATENTED MAY 1 1973
3,730,580
SHEET 1 OF 2
INVENTOR.
JOHN S. PAGE, JR.
BY
White, Haefliger & Bachand
ATTORNEYS.

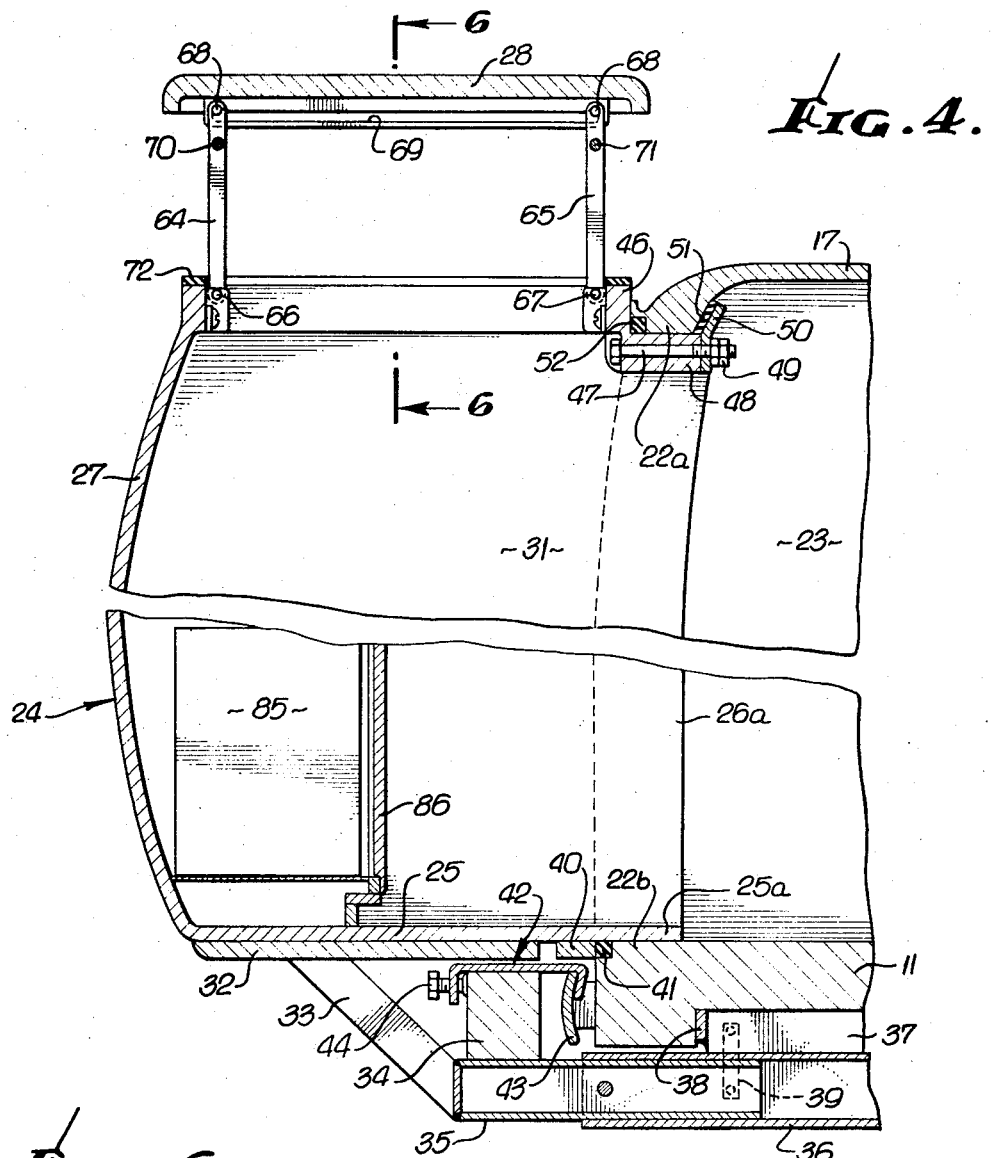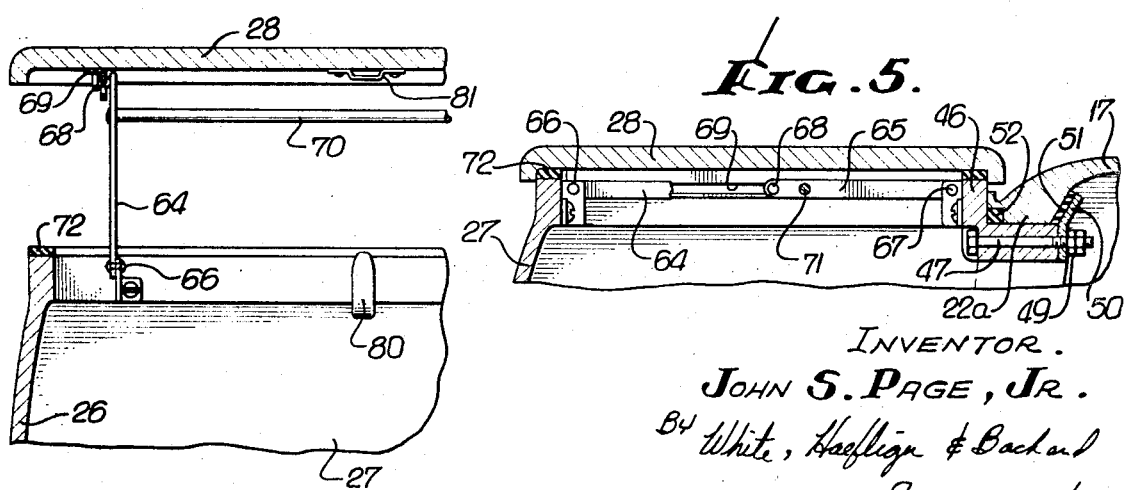

VAN CONVERSION TO CAMPER VEHICLE

BACKGROUND OF THE INVENTION

This invention relates generally to van-type vehicles, and more particularly concerns the modification of vans for camping use.

With the growth of interest in camping there has developed widespread interest in and use of vehicles adapted to camping requirements. At the same time, there is large scale usage of standard vans in and around urban areas for hauling purposes. Such standard vans have not been thought of as adapted to camping requirements, especially as respects cooking facilities; however, in view of ecological and other requirements for reduced vehicle usage, there may be said to be a need for such adaptation. Such a modified van usable for either standard urban purposes or for camping requirements, would also sharply reduce the cost of owning and operating both type vehicles.

SUMMARY OF THE INVENTION

It is a major object of the invention to meet the above expressed need, through the provision of apparatus for rapidly converting a standard van into a camper type vehicle embodying kitchen facilities, and vice versa. The apparatus is constructed to rearwardly extend the interior of a van body having a support frame, a rear door frame and rear doors hinged to the body to open rearwardly away from the door frame, and basically comprises:

a. a forwardly opening enclosure including a deck, side walls or supports, rear wall and roof, the enclosure sized to extend directly at the rear of the van body when said doors are opened rearwardly from the door frame, and b. a lower support for the enclosure located for attachment to rearward extent of the van body support frame.

Further, means may be provided to attach the van rear doors to the enclosure when the doors are opened away from the door frame, and so as to maintain full and unobstructed communication between the interior of both the enclosure and van body; the enclosure may comprise a kitchen unit, with stove, refrigerator and/or sink units at the rear thereof, to be accessible from the van interior; pop-up roof structure may be employed to provide additional headroom to the user standing in the enclosure; the means to attach the enclosure to the van body may comprise clamp structure holding the enclosure and van body in interfitting and sealed relation; and the enclosure may be carried by lower support structure having telescopic connection with the van support frame.

It should be noted that when the kitchen unit is rearward, the van is left in a form suitable for everyday use, and that the unit can be installed or removed in a very short time.

These and other objects and advantages of the invention, as well as the details of an illustrative embodiment, will be more fully understood from the following description and drawings, in which:

DRAWING DESCRIPTION

FIG. 1 is a side elevation of a camper van embodying the invention;

FIG. 2 is a left end view of the FIG. 1 van with enclosure in place;

FIG. 3 is an enlarged horizontal section taken on lines 3—3 of FIG. 2;

FIG. 4 is an enlarged vertical section taken on lines 4—4 of FIG. 2;

FIG. 5 is a fragmentary elevation, taken in section, showing the enclosure roof in down position;

FIG. 6 is a fragmentary vertical section taken in elevation on lines 6—6 of FIG. 4, and showing the enclosure roof in up position;

FIG. 7 is a section showing a modified seal between enclosure and van; and

FIG. 8 is a horizontal section through a modified form of the invention.

In the drawings, the camper van 10 has a support frame 11 on which body 12 is carried, the van typically also having side doors 13–15, wheels 16, and body roof 17. Rear doors and front and rear bumpers are seen at 18–21. Rear doors 18 and 19 are typically hinged at 120 and 121 to the rear door frame 22 to open rearwardly away from that frame and to open the rear of the van interior 23. The top reach of frame 22 appears at 22a in FIG. 4, and the bottom of the frame 22 is seen at 22b in FIG. 4.

In accordance with the invention, apparatus to rearwardly extend the van interior includes a forwardly opening enclosure 24 having a deck 25, side walls 26, rear wall 27 and roof 28. If desired, the rear wall may contain a window 27a, as seen in FIG. 2. The van is sized to extend directly at the rear of the van body 12 when rear doors 18 and 19 are opened to extend rearwardly from the frame, as for example to their position as seen in FIG. 3. As there shown, the enclosure fits closely between the rearwardly extended doors, which may be suitably releasably attached to the sides of the enclosure, as for example by the L-shaped retainer brackets 29, with inner terminals 29a held at 30 to the enclosure, and outer terminals 29b fitting the outer sides of the doors. Note in this regard that the interior 31 of the enclosure communicates directly with the van interior 23.

A lower support for the enclosure, as for example may include interconnected members 32–35, is located for releasable attachment to rearward extent of the van support frame 11, so as to transmit enclosure weight to the frame 11. Thus, for example, frame rearward extent may take the form of square cross section tubes 36 rigidly attached (as at 37–39) to the frame 11, to project horizontally rearwardly. Square cross section members 35 are telescopically receivable in interfitting relation with tubes 36, and to the extent shown in FIG. 4 to bring the enclosure wall forward edge portion 26a toward the rear door frame 22. Note that deck 25 then overlaps the van rear door frame lower extent 22b, at 25a, and that a shoulder 40 carried by the deck 25 abuts a seal 41 carried by van rear door frame lower extent 22b. A clamp 42 is manually operable to hold the enclosure in the position shown, the clamp hooking over a lug 43 on frame 11, and over member 34, and being tightenable at 44. As will be seen, the enclosure may, accordingly, be held in position sealing off between the enclosure and the van rear door frame, or body.

Means for attaching the enclosure to the van body may also include clamp structure releasable connecting the enclosure top frame 46 to the van rear door frame top reach 22a. As seen in FIG. 4, such structure may include a bolt 47 projecting through an L-shaped member 48 integral with top frame 46, and nuts 49 holding a bracket 50 to member 48. Reach 22a is then retained between the bracket and top frame 46, with seals located at 51 and 52. In addition, clamp structure 53 may be provided as seen in FIG. 3 between the enclosure wall forward extents 26a and the van rear door frame upward extents 22c. Such structure may include plates 54 and 55 and fasteners 56 extending therebetween. Plates 54 are held in engagement with seals 57 and 58, thereby to seal off between the enclosure and van rear door frame.

The enclosure may consist of a kitchen unit, incorporating stoves 60 at opposite sides of a sink 61, with faucets 62, all of these being directly accessible from the van body interior. Thus, the user may stand in interior 31 and on deck 25, as seen in FIG. 3, and utilize the stoves and/or sink, as required. Refrigerator and propane tank equipment may be carried as at 85, in cabinets 86.

In the event more headroom is needed by the user, structure may be provided to be carried by the enclosure or kitchen unit and supporting the roof 28 for optional movement between lowered and raised positions relative to the deck, as is clear from FIGS. 4, 5 and 6. Such structure may include a linkage with arms 64 and 65 pivoted to the top frame 46 at 66 and 67. The opposite ends of the arms carry lugs 68 guided in tracks 69 attached to the roof 28, as during raising and lowering of the roof. Cross members 70 and 71 may respectively interconnect arms 64 and 65. When the roof is lowered, a peripheral seal 72 seals off between the top frame 46 and the roof underside. Releasable latch 80 and keeper 81 hold the roof in down position.

FIG. 7 shows an alternative means to seal off between the enclosure wall 26 and the upright reach 22c of the van rear door frame. A rubber sealing flap 75 is attached at 76 to the reach 22c, and is deflected at 77 to seal against the wall 26a when the enclosure is inserted into position.

FIG. 8 shows a van body 80 to which an enclosure 81, as described, is attached; however, in this form, the body rear doors 82 open to the inside of the enclosure, to extend adjacent the enclosure side walls 83. A stove or sink appears at 84.

I claim:

1. In apparatus to rearwardly extend the interior of a van body having a support frame, a rear door frame and upright rear doors hinged to the body to open rearwardly away from the door frame while remaining upright, the combination comprising
   a. a forwardly opening enclosure including a deck, side wall means, rear wall and roof, the enclosure sized to extend directly at the rear of the van body when at least one of said doors is opened rearwardly from the door frame
   b. a lower support for the enclosure located for attachment to rearward extent of the van, and
   c. means for attaching said one door to the enclosure at one side of the interior thereof when said one door is opened rearwardly.

2. In apparatus to rearwardly extend the interior of a van body having a support frame, a rear door frame, and rear doors hinged to the body to open rearwardly away from the door frame, the combination comprising
   a. a forwardly opening enclosure including a deck, side walls, rear wall and roof, the enclosure sized to extend directly at the rear of the van body when the van doors are opened rearwardly from the door frame,
   b. a lower support for the enclosure located for attachment to rearward extent of the van, and
   c. means for attaching the van rear doors to the enclosure at opposite sides thereof when the doors are opened away from the door frame, so as to maintain full and unobstructed communication between the interiors of the enclosure and the van body.

3. The combination of claim 2 including a stove and refrigerator carried within the enclosure so as to be directly accessible from the van body interior.

4. The combination of claim 2 including a sink carried within the enclosure so as to be directly accessible from the van body interior.

5. The combination of claim 1 including structure carried by the enclosure and supporting the roof for optional movement between raised and lowered positions relative to the deck.

6. In combination with a van body having a support frame, a rear door frame, and rear doors hinged to the body to open rearwardly away from the door frame, apparatus for rearwardly extending the interior of said van body comprising
   a. a forwardly opening enclosure including a deck, side wall means, rear wall and roof, the enclosure extending directly at the rear of the van body and the van doors being upward rearwardly from the door frame,
   b. a lower support for the enclosure attached to rearward extent of the van, and
   c. said van doors extending at opposite sides of the enclosure.

7. The combination of claim 1 including clamp means for attaching the enclosure to the van body.

8. The combination of claim 7 wherein the clamp means is located at the forward extent of the enclosure top.

9. In combination with a van body having a support frame, a rear door frame, and rear doors hinged to the body to open rearwardly away from the door frame, apparatus for rearwardly extending the interior of said van body comprising
   a. a forwardly opening enclosure including a deck, side wall means, rear wall and roof, the enclosure extending directly at the rear of the van body and the van doors being displaced from the door frame,
   b. a lower support for the enclosure attached to rearward extent of the van,
   c. clamp means attaching the enclosure to the van body, and
   d. sealing means sealing off between the enclosure and rear door frame, said sealing means including a flap carried by the van rear door frame and compressively engaging the enclosure side wall.

10. The combination of claim 1 wherein the lower support has telescopic attachment to the van support frame below the level of the deck.

11. In combination with a van having a support frame, a rear door frame, and rear doors hinged to the body to open rearwardly away from the door frame, apparatus for rearwardly extending the interior of the van body comprising a. a forwardly opening enclosure including a deck, side wall means, rear wall and roof defining an interior zone directly at the rear of the van body interior and openly communicating therewith, b. a lower support for the enclosure attached to rearward extent of the van, and c. the van rear doors being open to project rearwardly in generally upright condition and at opposite sides of said interior zone.

* * * * *

UNITED STATES PATENT OFFICE
CERTIFICATE OF CORRECTION

Patent No. 3,730,580　　　　　　　　Dated May 1, 1973

Inventor(s) John S. Page, Jr.

It is certified that error appears in the above-identified patent and that said Letters Patent are hereby corrected as shown below:

Column 4, line 38; "the van doors being upward rearwardly from the" should read --the van doors being opened rearwardly from the--

Column 4, line 63; "body, and" should be -- , and --

Signed and sealed this 9th day of April 1974.

(SEAL)
Attest:

EDWARD M. FLETCHER, JR.　　　　　　C. MARSHALL DANN
Attesting Officer　　　　　　　　　　Commissioner of Patents